United States Patent Office 3,296,001
Patented Jan. 3, 1967

3,296,001
PIGMENT COMPOSITION, PROCESS FOR MANUFACTURE, AND ORGANIC MATERIALS CONTAINING THE SAME
Arnold Edwin Ambler and Richard William Tomlinson, Manchester, England, assignors to Imperial Chemical Industries Limited, London, England, a corporation of Great Britain
No Drawing. Filed May 2, 1963, Ser. No. 277,475
Claims priority, application Great Britain, May 15, 1962, 18,678/62
17 Claims. (Cl. 106—30)

This invention relates to the pigmentation of organic materials, particularly organic materials which are useful as coating compositions or casting, moulding or extrusion materials.

Under the term coating composition we include non-aqueous paints, lacquers, varnishes and enamels of all types, including those which dry by solvent evaporation, e.g. nitrocellulose, vinyl or acrylic lacquers; those which dry by air oxidation, e.g. alkyd media, oleoresinous varnishes; those which dry by chemical interaction or polymerisation produced by the effect of heat, e.g. urea or melamine resins, epoxy, acrylic or vinyl media, those which dry by chemical interaction produced by the addition of curing agents or catalysts, e.g. urethane, polyamide, polyester media. We also include all printing inks, whether applied in thick or thin films, and whether of the air oxidising or solvent evaporation type, to be applied by letterpress, lithographic, screen, gravure and flexographic processes, and such coating compositions which are used for coating on a substrate in the manufacture of, for example, carbon papers and typewriter ribbons. The term casting, moulding or extrusion composition includes plastic materials such as polyvinyl chloride and fibre-spinning materials such as cellulose acetate dope.

Pigments as normally manufactured are not readily dispersible in organic materials of the type described above and various procedures are known for improving the properties of pigments in this respect. Rosination is one example of such a procedure.

French Patent No. 1,277,177 describes and claims a process for the manufacture of pigmented organic materials of the type described above by mixing said organic material with a pigment composition obtained by flocculating an aqueous dispersion of a pigment in the presence of a latex of a synthetic polymer which, in the dry state, is miscible to the extent of at least 2% and preferably at least 5% with the organic material, the particle size of the latex being between 0.01 micron and 0.5 micron.

It is an object of this invention to provide solid pigment compositions which are superior to known pigment compositions, including those obtained by the process of French Patent No. 1,277,177, because they are more easily incorporated with organic materials. It is a further object of the invention to provide a process for the manufacture of such pigment compositions, and yet a further object of the invention to provide a process for the pigmentation of organic materials especially paints and other coating compositions, printing ink media, and liquid adjuvants or precursors of plastic materials.

The novel solid pigment compositions of our invention apparently possess an open lattice or network structure in which particles of finely divided pigment (of the size normally achieved by grinding) are separated from each other by a solid resinous substance. The resinous substance does not fill all the interstices between the pigment particles, but acts only as the temporary cement which is strong enough to hold the pigment particles in position in the lattice and prevents the pigment particles from agglomerating. When the composition is mixed with an organic material the resin dissolves and the pigment particles are released to form a fine dispersion in the organic material.

In consequence of the open lattice structure of our pigment compositions the percentage by volume of the composition which is occupied by the pigment (i.e. the volume concentration of pigment in the composition) is low. Known pigment compositions in which the volume concentration is low are usually in the form of bulky powders which can easily be compressed into a smaller volume. By compression the volume concentration of pigment in such powders is increased. Our compositions, on the other hand, having a rigid internal structure, are able to withstand a compressive pressure of 20 pounds per square inch without becoming very greatly reduced in volume. We are therefore able to differentiate our pigment compositions from prior art compositions by determining the volume concentration of pigment under a uniform compressive stress of 20 pounds per square inch. One convenient way of determining this characterising feature is described hereinafter.

According to a first feature of our invention we provide a solid pigment composition for the pigmentation of an organic material, said composition comprising a finely divided organic or carbon black pigment and a resinous substance which is soluble to the extent of at least 5% by weight in the organic material, and the composition being characterised in that it contains at least 60% by weight of pigment and that the volume concentration of pigment in the composition when under a uniform compressive pressure of 20 pounds per square inch is less than 18% in the case of an organic pigment and less than 13% in the case of carbon black.

As examples of organic pigments which may be constituents of our compositions there may be mentioned azo pigments, vat dye pigments, triphendioxazine pigments, phthalocyanine pigments for example copper phthalocyanine, its nuclear chlorinated derivatives and copper tetraphenyl or octaphenyl phthalocyanine, vat dye and other heterocyclic pigments for example linear quinacridone, lakes of acid, basic and mordant dyestuffs, and the various pigments of the organic type which are enumerated in volume 2 of "Colour Index, 2nd Edition," published jointly in 1956 by the Society of Dyers and Colourists and the American Association of Textile Chemists and Colorists, under the heading of "Pigments" and in subsequent authorised amendments thereto.

Carbon black appears to be unique among pigments insofar as certain known forms which do not possess the advantageous dispersion properties of our compositions have low volume concentrations, e.g. about 14%, under a uniform compressive pressure of 20 pounds per square inch.

There is no clear definable upper limit to the percentage by weight of pigment in our pigment compositions and it is generally desirable that the pigment content should be as high as practicable. When the pigment is a phthalocyanine pigment, a vat dye pigment or a lake dye, e.g. a lake of an acidic, basic or mordant dyestuffs, the preferred range of pigment content in the pigment composition is 60 to about 85% since within this range we obtain the compositions most easily incorporated with organic materials and having the best dispersion properties. Nevertheless, compositions containing as much as 90% or even 95% by weight of certain pigments, particularly azo pigments, have quite outstanding dispersion properties and may be incorporated into organic materials with the greatest facility.

The resinous or vitreous substances contained in our pigment compositions may be of natural or synthetic origin and the choice of substance will depend upon the nature of the particular organic material which is to be pigmented with the pigment composition. Our pigment compositions may contain any resinous substance which is soluble to the extent of at least 5% in the organic material to be pigmented.

Resinous substances which are of great value in the pigment compositions of the invention comprise rosin and chemically modified rosins such as hydrogenated rosin, polymerised rosin, disproportionated rosin and esterified rosin, and rosin which has been subjected to more than one such modification treatment. Other resinous substances which are of value in the pigment compositions of the invention comprise the polymers of vinylalkylbenzenes and copolymers of vinylalkylbenzenes with alkyl methacrylates or dialkyl fumarates which are described and claimed in United Kingdom applications Nos. 200/60, 43,565/60 and 43,566/60. Mixtures of resinous substances may be present in the compositions of the invention if desired, and are advantageous in some cases.

According to a further feature of the invention we provide a process for the manufacture of the solid pigment compositions hereinbefore defined which comprises producing an intimate mixture of (a) an organic or carbon black pigment in paste form obtained by electrolyte flocculation of an aqueous dispersion and (b) a resinous substance as aforesaid in a paste form obtained either by electrolyte flocculation of an aqueous dispersion or by precipitation from an aqueous solution of a salt, both (a) and (b) being substantially free from any dispersing agent in the chemical form originally present in the aqueous dispersion, and treating said intimate mixture in such a way as to soften the resinous substance and then reharden it.

In the process of the invention the operations of flocculating a pigment dispersion and flocculating or precipitating a resin dispersion or solution may if desired be carried out separately, the two pastes then being mixed. More conveniently a pigment dispersion (obtained for example by milling the pigment with the dispersing agent and water) may be mixed with a dispersion of the resinous substance and the two dispersions in the mixture may then be co-flocculated by admixture with a suitable electrolyte such as a water-soluble acid or salt. Alternatively, when the resin substance is one which has a water-soluble salt, a solution of such a salt may be mixed with a dispersion of a pigment and the dispersion then flocculated by means of an electrolyte which also precipitates the resinous substance. For example an acid may be added to flocculate a pigment and at the same time precipitate rosin from a solution of potassium rosinate.

Whether the resinous or vitreous substance is used as a latex or as a water-soluble salt, it is always advantageous to carry out the flocculation under turbulent conditions, for example with a violent agitation.

The resinous substance used in our process may be one which, in the form of its water-soluble salt, can also act as a dispersing agent. Rosin salts are examples of such substances. When such a substance is used it is convenient to disperse the pigment in an aqueous solution of the salt of the resinous substance, e.g. by milling. Otherwise the pigment dispersion may contain a substance functioning solely as a dispersing agent. It is important, however, that any substance used for this purpose should either be removed from the flocculated pigment (e.g. by washing) before the softening operation is carried out or else it should be one which is chemically altered by the electrolyte used for flocculation, and is thereby rendered insoluble in water and ineffective as a dispersing agent. Especially useful are anionic dispersing agents which are water-soluble and effective in the form of alkali-metal or ammonium salts but are water-insoluble and ineffective in the form of their free acids or salts with such metals as calcium. Examples of such dispering agents are Turkey red oil and fatty acid salts such as sodium stearate or linoleate or polymerised (e.g. dimerised) tall oil acids. When such dispersing agents are used, flocculation of the aqueous dispersion may be brought about by admixture with a water-soluble acid or salt of a metal other than an alkali-metal, e.g. a calcium or barium salt, or certain salts of organic bases, e.g. diphenylguanidine.

In one embodiment of the process of the invention the mixture of flocculated pigment and flocculated or precipitated resinous substance is heated to raise the temperature above the softening point of the resin. In this embodiment a resin having a softening point in the range of 25–150° is preferred. The softening (or sintering) point of a resinous material is sometimes called the penetrometer melting point and may be determined by the method described by Edgar and Ellery in Journal of the Chemical Society 1952, page 2638. The point in the process at which the temperature is raised is not critical and, as desired, either the flocculation may be carried out above the softening temperature or after flocculation the temperature may be raised above the softening point. In either case, it is desirable that the temperature should remain above the softening point for at least 1 hour. The mixture is then cooled below the softening point of the resinous substance and the pigment composition is isolated and dried.

In a second embodiment of the process of the invention the mixture of flocculated pigment and flocculated or precipitated resinous substance is treated with a liquid which is a solvent for the resinous substance and has a water-solubility of at least 0.1% by weight. Water-miscible liquids such as acetone may be used or liquid such as toluene which are only slightly soluble in water. Petroleum hydrocarbons, however, being almost completely insoluble in water, are ineffective. As desired the said liquid may be added either before or after flocculation of the pigment and flocculation or precipitation of the resinous substance takes place. To induce softening of the resinous material adjustment of the electrolyte content of the liquor may be necessary or desirable. If desired, the temperature of the mixture may be raised. It is also possible to soften the resinous substance by adding to the mixture of flocculated pigment and flocculated or precipitated resinous substance a liquid of such a nature or in such quantity as to produce an aqueous mixture which softens the resin only when the temperature is raised. Rehardening of the resinous substance may then be brought about in one of several ways. Water may be added to produce a mixture from which the resin is no longer able to extract sufficient solvent to soften it, or the temperature may simply be lowered. Alternatively the solvent, if sufficiently volatile may be removed by distillation, or the softened resinous substance may be rehardened by a chemical treatment, for example by adding calcium or barium chloride to form a calcium or barium salt of the resinous substance. After rehardening the resin by any suitable method, the pigment composition may be separated from the liquor and dried.

Drying of the pigment composition obtained in the process of the invention should be carried out under conditions which do not soften the resinous substance.

According to yet a further feature of the invention we provide a process for the pigmentation of organic materials useful as coating compositions or casting, moulding, or extrusion materials which comprises mixing said organic material with a solid pigment composition as hereinbefore defined.

Pigmentation of fluid organic materials, for example liquid plasticisers for plastics and especially of paint, and nonviscous printing ink media may be carried out efficiently by stirring in the pigment compositions of our invention, using conventional mixing equipment for liquids for example a cavitation mixer such as a Torrance Highspeed Cavitation Dispenser or a Cowles Dissolver, the dispersing action of which is effected by high speed rotation of a toothed disc in the mixture. Dispersion of the pigment throughout the liquid organic material is usually complete after stirring for quite a short period of time, for example up to 30 minutes, depending upon the particular liquid organic material used. During the mixing operation the resinous component of the composition dissolves in the liquid organic material releasing the pigment particles to form a fine dispersion. In this simple way, therefore, liquid coating compositions such as paints and liquid printing inks containing volatile organic solvent may be manufactured efficiently without the use of grinding equipment such as ball mills. The degree of fineness of the pigment particles in the coating composition depends upon the pigment particle size within the open lattice structure of the composition used and since practically no disruptive force is applied during a simple mixing operation there is no reduction in particle size beyond this limit. Indeed no further particle size reduction is necessary as the coating compositions obtained are completely satisfactory, for example paints manufactured by mixing our compositions with an alkyd paint medium are satisfactory for gloss and freedom from oversized particles as measured by conventional methods.

Viscous printing inks based principally on printing varnishes and resins and containing no volatile solvent may be manufactured by working the compositions of our invention with a printing ink medium (varnish) in a heavy duty dough mixer, such as a Cox Dual-Mix or Baker-Perkins mixer. No further milling is required to produce a satisfactory concentrate for use in the formulation of finished printing inks.

The avoidance of the use of milling equipment is an important advance in the technology of paint and printing ink manufacture. Milling equipment is bulky and costly to maintain and the operation of milling is time consuming. During recent years paint and printing ink manufacturers have increasingly favoured the use of pigments which disperse with little mechanical effort. The pigment compositions of this invention disperse in paint and printing ink media with the very minimum of mechanical effort, using equipment whose action is not based on relative movement of closely mating surfaces. Although our pigment compositions are necessarily more expensive to produce than the pigments from which they are made they provide for a greater compensating saving in labour and manufacturing costs to the paint and printing ink manufacturer.

Our compositions may also be used advantageously for the pigmentation of casting, moulding and extrusion materials, particularly plastics. When a liquid adjuvant such as a plasticiser is employed the composition may be mixed with the adjuvant which may then be used in normal manner for fabricating the material into solid objects. The conventional operation of milling a pigment with a liquid adjuvant (e.g. a plasticizer) is thus replaced by the simple operation of mixing.

Casting, moulding and extrusion materials, particularly plastics, may also be pigmented by the use of our compositions in conventional procedures such as milling hot rolls. In this procedure our compositions are superior to known pigment compositions in that they require a shorter milling time to produce satisfactory pigmentation.

Another conventional pigmentation procedure which may be used with our compositions is that of chip-coating. In this procedure chips of the material are tumbled with the pigment composition and the coated chips are fabricated into solid objects. Satisfactory evenly pigmented material is obtained and the results are superior to those obtained when known pigment compositions are used.

We now describe a method by which we have determined the volume concentration of pigment in our pigment composition.

The product to be tested is gently rubbed through a sieve of 30 British Standard mesh. The weighed quantity of the powder thus obtained is placed in a glass cylinder of uniform cross section (we used the barrel of a 10 cubic centimetre hypodermic syringe with the outlet lightly closed by a pin) fitted with a piston connected by a rod to the piston in a small compressed air chamber where the pressure can be maintained steady and measured. We used the barrel of a 20 cc. syringe as compressed air chamber. Pressure applied to the piston in the compressed air chamber is transmitted to the powder in the glass cylinder and the pressure actually communicated to the powder can be calculated from the knowledge of the relative dimensions of the cylinder and compressed air chamber. After applying a pressure of 20 pounds per square inch to the powder for half an hour the height of the plug of pigment composition so formed is measured with a cathetometer. The volume concentration of pigment in the composition (V) can then be calculated from the formula $$V = \frac{CW}{\pi r^2 h d}$$

where $C$ = weight of powder taken in grains
$W$ = percentage by weight of pigment in composition
$r$ = radius of cylinder in centimetres
$h$ = height of plug in centimetres
$d$ = density of the pigment component of the composition in grams per cubic centimetre.

To obtain accurate results it is desirable that the weight of pigment composition taken is such that $h/2r$ is less than 0.2 and certainly it should be less than 1.0. Usually by taking 0.5 gram of pigment composition in the apparatus described we obtain consistent and satisfactory measurements. The quantity $d$ in the above formula is the true density of the pigment when pure, and this can usually be found from published tables of pigment densities.

The invention is illustrated but not limited by the following examples in which the parts and percentages are by weight unless otherwise stated and the abbreviation C.I. refers to "Colour Index," second edition, published jointly by the Society of Dyers and Colourists and the American Association of Textile Chemists and Colorists.

MANUFACTURE OF SOLID PIGMENT COMPOSITIONS

*Example 1*

100 parts of Monastral Fast Blue LBX (C.I. Pigment Blue 15) aqueous press paste, containing 20 parts of pigment, is milled with 20 parts of a 10% solution in potassium hydroxide (1.2 equivalents) of a polymerised rosin which has a softening point of 60.8° C. Such a rosin is miscible to the extent of 10% with alkyd resin paint media, lithographic varnish, fluid printing ink media, nitrocellulose paint media and plasticised polyvinyl chloride. 66 parts of the 10% solution of polymerised rosin are added and the resulting mixture is poured in 400 parts of vigorously agitated 10% sulphuric acid solution. The temperature of the mixture is raised to 90° C. for 1 hour. The mixture is then cooled to 30° C. and the solid pigment composition is filtered off, washed free of acid and dried in a current of air at 40° C.

A blue pigment composition in powder form is obtained which contains 70% by weight of pigment, and has a pigment volume concentration of 10.4% under a pressure of 20 pounds per square inch.

By using Monastral Fast Green GN (C.I. Pigment Green 7) Monolite Fast Yellow 10G (C.I. Pigment Yellow 3) or Monolite Fast Scarlet RN (C.I. Pigment Red 3) in place of Monastral Fast Blue LBX in this example, there are obtained green, yellow or scarlet pigment compositions in powder form which contain 70% by weight of pigment and have pigment volume concentrations of less than 18% under a pressure of 20 pounds per square inch.

Example 2

In place of the polymerised rosin used in Example 1 there is used an equal weight of a hydrogenated rosin which has a softening point of 41° C. Such a rosin is miscible to the extent of 10% with the media mentioned in Recipe 1. Pigment compositions in powder form are obtained which contain 70% of pigment, and have pigment volume concentrations of less than 18% under a pressure of 20 pounds per square inch.

Example 3

Example 1 is repeated, replacing the 66 parts of 10% solution of polymerised rosin by 66 parts of a finely divided aqueous dispersion of Bedesol 74, a modified rosin esterified with pentaerythritol ("Bedesol" is a registered trademark, the property of Imeperial Chemical Industries Limited). This rosin also is miscible to the extent of 10% with all the media mentioned in Recipe 1 except nitrocellulose paint media. Pigment compositions in powder form are obtained which contain 70% of pigment, and have pigment volume concentrations of less than 18% under a pressure of 20 pounds per square inch.

Example 4

365 parts of a milled aqueous suspension of Monastral Fast Blue LBX (C.I. Pigment Blue 15) containing 61.5 parts of pigment and 7.3 parts of a polymerised rosin (the same as used in Example 1) in the form of its potassium salt are mixed with 200 parts of a 10% solution of the polymerised rosin in aqueous potassium hydroxide, and the mixture is poured into 1500 parts of vigorously agitated 10% sulphuric acid containing 100 parts of methyl ethyl ketone at 18° C. After standing for 3 hours the total volume is made up to 8,000 parts by addition of cold water and the mixture left to stand for 16 hours. The solid pigment composition is then filtered off, washed free of acid and methyl ethyl ketone, and dried in a current of air at 35–40° C., yielding a pigment composition containing 70% of pigment. The pigment concentration by volume in this composition under a pressure of 20 pounds per square inch is 8.8%.

Example 5

575 parts of a 10% solution in aqueous potassium hydroxide of the same polymerised rosin as used in Example 1 is mixed with 1,000 parts of water and poured into 4,000 parts of 1% sulphuric acid under conditions of high turbulence at room temperature. The flocculated suspension is then filtered and washed acid free. 1,000 parts of a milled suspension of Monastral Fast Blue LBX (C.I. Pigment Blue 15) containing 173 parts of pigment and 20 parts of polymerised rosin, is mixed with 500 parts of water and drowned into 4,000 parts of 1% sulphuric acid under conditions of high turbulence at room temperature. The flocculated suspension is then filtered and washed acid free.

The suspensions of pigment and polymerised rosin are then combined, the total bulk adjusted to 4,000 parts by the addition of water, and thoroughly mixed using a high speed agitator. The mixed suspension is then heated to 85° C., allowed to cool, and the solid pigment composition is filtered off and dried in a current of air at 35–40° C., yielding a pigment composition containing 70% of pigment. The pigment concentration by volume in this composition under a pressure of 20 pounds per square inch was 9.7%.

Example 6

In place of the polymerized rosin in Example 4 there is used the same quantity of "Dymerex," a resin consisting essentially of resin acid dimers and marketed by Hercules Powder Company. The methyl ethyl ketone usage is increased to 200 parts. A pigment composition is obtained having a pigment concentration by volume of 10.2% under a pressure of 20 pounds per square inch.

Alternatively, 140 parts of methyl ethyl ketone may be used and the resin softened by heating to 65° C. and rehardened by cooling. In the resulting pigment composition the pigment concentration by volume under a pressure of 20 pounds per square inch is 11.7%.

Example 7

Example 4 is repeated, replacing the 10% sulphuric acid by a 1.6% solution of calcium chloride and increasing the quantity of methyl ethyl ketone to 200 parts. The rosin is softened by heating to 65° C. and rehardened by cooling. In the resulting pigment composition the pigment concentration by volume under a pressure of 20 pounds per square inch is 12.6%.

Alternatively after softening, the methyl ethyl ketone may be removed by distillation, to yield a pigment composition wherein the pigment concentration by volume under a pressure of 20 pounds per square inch is 13.2%.

Alternatively the methyl ethyl ketone may be replaced by 15 parts of toluene, emulsified into the 10% solution of polymerised rosin, softening carried out by heating above 65° C. and rehardening by distillation of the toluene. The pigment composition obtained in this way has a pigment concentration by volume under a pressure of 20 pounds per square inch of 12.8%.

Example 8

Example 1 is repeated using wood rosin in place of polymerised rosin and hydrochloric acid in place of sulphuric acid, and hardening the product while still hot (80° C.) by adding a slurry of 30 parts of calcium hydroxide in 1500 parts of water. The product is filtered off, washed with hot water and dried.

In the composition obtained the pigment concentration by volume under a pressure of 20 pounds per square inch is 9.7%.

Example 9

155 parts of Monastral Fast Blue LBX press paste, 4.5 parts of "Dimer Acid" (a mixture of acids obtained by dimerisation of naturally occurring aliphatic acids containing about 18 carbon atoms), 1.6 parts of potassium hydroxide and 69 parts of water are gravel milled to produce a finely divided dispersion. 198.2 parts of this dispersion are mixed with 39.3 parts of an aqueous dispersion of a vinyl toluene polymer (obtained as described later in this example), and the mixture is flocculated by adding it to 1% barium chloride solution at 90° C., with violent agitation. The mixture is maintained at 70° C. for 2 hours, then cooled to 30° C., filtered and washed with water and dried with hot air at 45° C. The resulting product has a pigment volume concentration, of 10.4% under a pressure of 20 pounds per square inch.

The dried starting material (Monastral Fast Blue LBXS) has a pigment volume concentration of 20.8% under a pressure of 20 pounds per square inch.

Alternatively in this example the dispersions of Monastral Fast Blue LBX and of the vinyl toluene polymer may be separately flocculated by adding to 1% barium chloride solution at below 20° C., the precipitate filtered off, combined and passed through a homogeniser, then heated as described above.

The aqueous dispersion of vinyl toluene polymer is obtained as follows: A mixture of 16.7 parts of stearic acid and 393 parts of water is stirred at 80° C. while 9.6 parts of 30% sodium hydroxide solution is added followed by a solution of 0.33 part of potassium persulphate in 34 parts of water. After displacing the air by nitrogen a mixture of 17 parts of t-dodecyl mercaptan and 149 parts of vinyl toluene is added during 1 hour. After stirring at 80° C. for a further hour the dispersion is cooled. The polymer contained in this dispersion has a softening point of about 60° C. and is soluble in paint media (e.g. a 69% oil length linseed pentaerythritol phthalate alkyd resin) to the extent of at least 5%.

Pigment compositions similar to the one described in this example are obtained by using any of the latices A to J described in French Patent No. 1,277,177 in place of the dispersion of vinyl toluene polymer, sufficient of the latex being used, in each case, to give a final product containing 60 to 85% by weight of pigment.

*Example 10*

45 parts of carbon black (Kosmos I), 45 parts of a 10% solution of stearic acid in 3% potassium hydroxide solution, and 450 parts of water, are gravel-milled to produce a finely divided dispersion. 425 parts of this dispersion are mixed with 40.6 parts of an aqueous dispersion of a vinyl toluene polymer obtained as described at the end of Example 9. The mixture is flocculated by addition to 1% sulphuric acid at 90° C. with violent agitation. The mixture is maintained at 85° C. for 1 hour, then cooled to 20° C. and filtered, washed and dried with hot air, at 35° C.

The resulting product has a pigment volume concentration of 8.1% under a pressure of 20 pounds per square inch.

The starting material (Kosmos I) has a pigment volume concentration of 14.5% under a pressure of 20 pounds per square inch.

By the methods described in detail in Examples 1 to 10 pigment compositions having a pigment volume concentration of less than 18% under a pressure of 20 pounds per square inch are obtainable containing the following percentages by weight of the pigments indicated.

*Azo pigments*

| | Percent |
|---|---|
| Monolite Fast Scarlet RN (C.I. Pigment Red 3) | 96 |
| Monolite Fast Yellow 10G (C.I. Pigment Yellow 3) | 90 |
| Monolite Fast Yellow GN (C.I. Pigment Yellow 1) | 90 |
| Monolite Fast Yellow GL (C.I. Pigment Yellow 13) | 90 |
| Monolite Fast Yellow GT (C.I. Pigment Yellow 12) | 90 |
| Monolite Fast Orange 3G (C.I. Pigment Orange 1) | 70 |
| Monolite Fast Red B (C.I. Pigment Red 1) | 75 |
| Monolite Fast Rubine FBH (C.I. Pigment Red 11) | 70 |

*Vat dye and other heterocyclic pigments*

| | Percent |
|---|---|
| Flavanthrone | 80 |
| Pyranthrone | 75 |
| Bromoiodoanthranthrone | 70 |
| Lin-quinacridone | 70 |
| Indanthrone | 70 |

*Lake dye pigments*

| | Percent |
|---|---|
| Monolite Bordeau BL (C.I. Pigment Red 54) | 70 |
| Deep Crimson Madder M (C.I. Pigment Red 83) | 70 |
| Monolite Red D (C.I. Pigment Red 50) | 70 |
| Rubine Toner 4B (C.I. Pigment Red 48) | 80 |

*Phthalocyanine pigments*

| | Percent |
|---|---|
| Monastral Fast Blue BX (C.I. Pigment Blue 15) | 85 |
| Monastral Fast Blue LBX (C.I. Pigment Blue 15) | 75 |
| Monastral Fast Green GN (C.I. Pigment Blue 7) | 80 |
| Monastral Fast Green 3Y (copper chloro-bromo-phthalocyanine) | 70 |
| Monastral Fast Green 6Y (copper chloro-bromo-phthalocyanine) | 70 |

The percentages given are not necessarily the highest percentages at which the pigment compositions may be obtained.

PIGMENTATION OF ORGANIC MATERIALS

*Example 11.—Manufacture of alkyd resin paint*

14 parts of any one of the solid pigment compositions obtained as described in Examples 1–10 is stirred for 5 minutes with 86 parts of a 69% oil length linseed pentaerythritol phthalate alkyl resin with added dryers. The mixture so obtained is then diluted with a standard titanium oxide white paint in the same medium. The paint obtained is not inferior to a paint made in conventional manner using the original pigment.

*Example 12.—Manufacture of viscous printing ink*

60 parts of any one of the solid pigment compositions obtained as described in Examples 1–10 is mixed with 90 parts of middle lithographic varnish (viscosity 110 poises at 25° C.) with added dryers in a Baker-Perkins mixer for 20 minutes and then diluting with 30 parts of the varnish to give a finished ink which is not inferior to an ink made in conventional manner from the original pigment.

*Example 13.—Manufacture of fluid printing ink*

11.4 parts of any one of the solid pigment compositions obtained as described in Examples 1–10 is stirred at high speed in a Torrance Cavitation Disperser with a medium comprising 66 parts of zinc-calcium rosinate, 10 parts of cyclic rubber, 56.6 parts of toluene and 56.6 parts of a petroleum distillate of boiling range 100–120° C. After 20 minutes the pigment has dispersed to give a concentrated fluid printing ink.

Alternatively, fluid printing inks may be manufactured from the solid pigment compositions of Examples 1–10 by using media comprising (a) 40 parts of the esterified modified rosin marketed by Imperial Chemical Industries Limited as Bedesol 76, and 60 parts of ethanol;

(b) 10 parts of nitrocellulose, 10 parts of the short oil length non-drying alkyd marketed by Imperial Chemical Industries Limited as Paralac A 585, 40 parts of methyl ethyl ketone and 40 parts of ethyl acetate.

*Example 14.—Manufacture of pigmented polyvinyl chloride*

(a) 150 parts of dioctylphthalate and 300 parts of any one of the solid pigment compositions obtained as described in Examples 1–10 are stirred together for 15 to 30 minutes at the end of which time an excellent dispersion, free from hard particles and of excellent colour value is obtained. By the use of a high speed stirrer even shorter dispersion times may be used. The paste is diluted with more dioctylphthalate and used as a plasticiser for polyvinyl chloride compositions. The coloured compositions have brighter and purer shades than those obtained by dispersing the corresponding pigments in dioctylphthalate in the usual way, using heavy grinding equipment such as a roller mill or ball mill.

(b) 300 parts of a chipped polyvinyl chloride composition (either plasticized or unplasticized) is rolled or tumbled for 5 to 10 minutes with 3 parts of any one of the pigment compositions obtained as described in Examples 1–10. The tumbled composition is then extruded or injection-moulded to give coloured articles which are very much superior in freedom from specks of undispersed colour and in brightness of shade to corresponding articles made by using the original pigments by a similar technique.

(c) 2 parts of any one of the pigment compositions obtained as described in Examples 1–10 are added to 100 parts of polyvinylchloride resin in a Baker-Perkins mixer, together with 2 parts of a cadmium/barium laurate stabilizer and 1 part of stearic acid, and mixed for 10 minutes. 45 parts of dioctylphthalate and 5 parts of epoxidized soya bean oil are added and mixed for a further 5 minutes. The damp mixture is then gelled for 4 minutes at 140° C. on open rolls to give a coloured material with excellent freedom from specks and of brighter shade than a similar material obtained by using the original pigment.

We claim:
1. A solid pigment composition for the pigmentation of an organic material, said composition consisting essentially of a finely divided phthalocyanine pigment and a resinous substance which is soluble to the extent of at least 5% in the organic material, and the composition being characterised in that it contains from 60 to 85% by weight of pigment and that the volume concentration of pigment in the composition when under a uniform compressive pressure of 20 pounds per square inch is less than 18%.

2. A solid pigment composition for the pigmentation of an organic material, said composition consisting essentially of a finely divided vat dye pigment and a resinous substance which is soluble to the extent of at least 5% in the organic material, and the composition being characterised in that it contains from 60 to 85% by weight of pigment and that the volume concentration of pigment in the composition when under a uniform compressive pressure of 20 pounds per square inch is less than 18%.

3. A solid pigment composition for the pigmentation of an organic material, said composition consisting essentially of a finely divided lake dye pigment and a resinous substance which is soluble to the extent of at least 5% in the organic material, and the composition being characterised in that it contains from 60 to 85% by weight of pigment and that the volume concentration of pigment in the composition when under a uniform compressive pressure of 20 pounds per square inch is less than 18%.

4. A solid pigment composition for the pigmentation of an organic material, said composition consisting essentially of a finely divided azo pigment and a resinous substance which is soluble to the extent of at least 5% in the organic material, and the composition being characterised in that it contains from 60 to 95% by weight of pigment and that the volume concentration of pigment in the composition when under a uniform compressive pressure of 20 pounds per square inch is less than 18%.

5. Process for manufacture of a pigment composition for the pigmentation of an organic material which comprises producing an intimate mixture of
(a) a pigment in paste form obtained by electrolyte flocculation of an aqueous dispersion of a pigment selected from the class consisting of organic pigments and carbon black, and
(b) an aqueous paste of a resinous substance which is soluble to the extent of at least 5% by weight in the aforesaid organic material said paste being obtained by electrolyte flocculation of an aqueous dispersion,
both (a) and (b) being free from any dispersing agent in the chemical form originally present in the aqueous dispersion, said pigment being present in an amount from 60% to 95% by weight of said mixture, softening the resinous substance in said mixture and then re-hardening the same.

6. Process for manufacture of a pigment composition for the pigmentation of an organic material which comprises producing an intimate mixture of
(a) a pigment in paste form obtained by electrolyte flocculation of an aqueous dispersion of a pigment selected from the class consisting of organic pigments and carbon black, and
(b) an aqueous paste of a resinous substance which is soluble to the extent of at least 5% by weight in the aforesaid organic material and has a softening point within the range of 25° to 150° C., said paste being obtained by electrolyte flocculation of an aqueous dispersion,
both (a) and (b) being free from any dispersing agent in the chemical form originally present in the aqueous dispersion, said pigment being present in an amount from 60% to 95% by weight of said mixture, and heating said intimate mixture above the softening point of the resinous substance and cooling to re-harden the resinous substance.

7. Process for manufacture of a pigment composition for the pigmentation of an organic material which comprises producing an intimate mixture of
(a) a pigment in paste form obtained by electrolyte flocculation of an aqueous dispersion of a pigment selected from the class consisting of organic pigments and carbon black, and
(b) an aqueous paste of a resinous substance which is soluble to the extent of at least 5% by weight in the aforesaid organic material said paste being obtained by electrolyte flocculation of an aqueous dispersion,
both (a) and (b) being free from any dispersing agent in the chemical form originally present in the aqueous dispersion, said pigment being present in an amount from 60% to 95% by weight of said mixture, and softening the resinous substance by treating said intimate mixture with a liquid which is a solvent for the resinous substance and has a water-solubility of at least 0.1% by weight, and then re-hardening the resinous substance.

8. Process for manufacture of a pigment composition for the pigmentation of an organic material which comprises producing an intimate mixture of
(a) a pigment in paste form obtained by electrolyte fluocculation of an aqueous dispersion of a pigment selected from the class consisting of organic pigments and carbon black said paste being free from any dispersing agent in the chemical form originally present in the dispersion, and
(b) an aqueous paste of a resinous substance which is soluble to the extent of at least 5% by weight in the aforesaid organic material said paste being obtained by precipitation from an aqueous solution of a salt,
said pigment being present in an amount from 60% to 95% by weight of said mixture, softening the resinous substance in said mixture and then re-hardening the same.

9. Process for manufacture of a pigment composition for the pigmentation of an organic material which comprises producing an intimate mixture of
(a) a pigment in paste form obtained by electrolyte flocculation of an aqueous dispersion of a pigment selected from the class consisting of organic pigments and carbon black said paste being free from any dispersing agent in the chemical form originally present in the dispersion, and
(b) an aqueous paste of a resinous substance which is soluble to the extent of at least 5% by weight in the aforesaid organic material and has a softening point within the range 25° to 150°, said paste being obtained by precipitation from an aqueous solution of a salt,
said pigment being present in an amount from 60% to 95% by weight of said mixture, and heating said intimate mixture above the softening point of the resinous substance and cooling to re-harden the resinous substance.

10. Process for manufacture of a pigment composition for the pigmentation of an organic material which comprises producing an intimate mixture of
(a) a pigment in paste form obtained by electrolyte flocculation of an aqueous dispersion of a pigment selected from the class consisting of organic pigments and carbon black said paste being free from any dispersing agent in the chemical form originally present in the dispersion, and
(b) an aqueous paste of a resinous substance which is soluble to the extent of at least 5% by weight in the aforesaid organic material said paste being obtained by precipitation from an aqueous solution of a salt, said pigment being present in an amount from 60% to 95% by weight of said mixture, and softening the resinous substance by treating said intimate mixture with a liquid which is a solvent for the resinous substance and has a water-solubility of at least 0.1% by weight, and then re-hardening the aqueous substance.

11. Process for the pigmentation of an organic material which comprises mixing said organic material with a pigment composition consisting essentially of:
(1) a solid resinous substance which is soluble to the extent of at least 5% in the organic material; and
(2) from 60% to 95% by weight of a pigment selected from the group consisting of
  (a) organic pigment in a volume concentration in said composition of less than 18% when said composition is under a uniform compressive pressure of 20 lb./sq. in.; and
  (b) carbon black in a volume concentration in said composition of less than 13% when said composition is under said compressive pressure.

12. Process for the manufacture of a pigmented liquid coating composition which comprises mixing a liquid medium for the coating composition with a pigment composition consisting essentially of:
(1) a solid resinous substance which is soluble to the extent of at least 5% in the organic material; and
(2) from 60% to 95% by weight of a pigment selected from the group consisting of
  (a) organic pigment in a volume concentration in said composition of less than 18% when said composition is under a uniform compressive pressure of 20 lb./sq. in.; and
  (b) carbon black in a volume concentration in said composition of less than 13% when said composition is under said compressive pressure.

13. Process for the manufacture of a viscous printing ink which comprises working, in a heavy duty dough mixer, a viscous printing ink medium with a pigment composition consisting essentially of
(1) a solid resinous substance which is soluble to the extent of at least 5% in the organic material; and
(2) from 60% to 95% by weight of a pigment selected from the group consisting of
  (a) organic pigment in a volume concentration in said composition of less than 18% when said composition is under a uniform compressive pressure of 20 lb./sq. in.; and
  (b) carbon black in a volume concentration in said composition of less than 13% when said composition is under said compressive pressure.

14. Process for the manufacture of pigmented plastic objects which comprises mixing a liquid adjuvant for the plastic with a pigment composition consisting essentially of
(1) a solid resinous substance which is soluble to the extent of at least 5% in the organic material; and
(2) from 60% to 95% by weight of a pigment selected from the group consisting of
  (a) organic pigment in a volume concentration in said composition of less than 18% when said composition is under a uniform compressive pressure of 20 lb./sq. in.; and
  (b) carbon black in a volume concentration in said composition of less than 13% when said composition is under said compressive pressure,
and then forming the plastic material into a solid object using said pigmented adjuvant.

15. Process for the manufacture of pigmented plastic objects which comprises roll milling a plastic material with a pigment composition consisting essentially of
(1) a solid resinous substance which is soluble to the extent of at least 5% in the organic material; and
(2) from 60% to 95% by weight of a pigment selected from the group consisting of
  (a) organic pigment in a volume concentration in said composition of less than 18% when said composition is under a uniform compressive pressure of 20 lb./sq. in.; and
  (b) carbon black in a volume concentration in said composition of less than 13% when said composition is under said compressive pressure,
and forming the pigmented plastic material into solid objects.

16. Process for the manufacture of pigmented plastic objects which comprises tumbling chips of plastic material with a pigment composition consisting essentially of
(1) a solid resinous substance which is soluble to the extent of at least 5% in the organic material; and
(2) from 60% to 95% by weight of a pigment selected from the group consisting of
  (a) organic pigment in a volume concentration in said composition of less than 18% when said composition is under a uniform compressive pressure of 20 lb./sq. in.; and
  (b) carbon black in a volume concentration in said composition of less than 13% when said composition is under said compressive pressure
and forming the coated chips into solid objects.

17. A solid pigment composition for the pigmentation of an organic material, said pigment composition consisting essentially of:
(1) a solid resinous substance which is soluble to the extent of at least 5% in the organic material; and
(2) from 60% to 95% by weight of a pigment selected from the group consisting of
  (a) organic pigment in a volume concentration in said composition of less than 18% when said composition is under a uniform compressive pressure of 20 lb./sq. in.; and
  (b) carbon black in a volume concentration in said composition of less than 13% when said composition is under said compressive pressure.

References Cited by the Examiner

UNITED STATES PATENTS

| | | | |
|---|---|---|---|
| 2,301,143 | 11/1942 | Roon et al. | 260—767 |
| 2,348,594 | 5/1944 | Bernardi | 106—29 |
| 2,361,740 | 10/1944 | Boggs | 106—27 |
| 2,353,058 | 7/1944 | Mitchell | 260—31 |
| 2,647,094 | 7/1953 | Hahn | 260—23 |
| 2,649,382 | 8/1953 | Vesce | 106—193 |
| 2,744,027 | 5/1956 | Struve et al. | 106—289 |
| 2,794,747 | 6/1957 | Bloch | 106—28 |
| 3,159,498 | 12/1964 | Davis et al. | 106—20 |
| 3,220,965 | 11/1965 | Ambler | 260—22 |

SAMUEL H. BLECH, *Primary Examiner.*

MORRIS LIEBMAN, ALEXANDER H. BRODMERKEL, *Examiners.*

J. B. EVANS, *Assistant Examiner.*